United States Patent
Funck et al.

(10) Patent No.: US 7,506,532 B2
(45) Date of Patent: Mar. 24, 2009

(54) METHOD FOR CALIBRATING ULTRASOUND CLAMP-ON FLOWMETERS

(75) Inventors: Bernhard Funck, Rostock (DE); Andreas Mitzkus, Berlin (DE)

(73) Assignee: Flexim Flexible Industriemesstechnik GmbH, Berlin (DE)

( * ) Notice: Subject to any disclaimer, the term of this patent is extended or adjusted under 35 U.S.C. 154(b) by 211 days.

(21) Appl. No.: 11/631,131

(22) PCT Filed: Jun. 20, 2005

(86) PCT No.: PCT/EP2005/052847

§ 371 (c)(1),
(2), (4) Date: Feb. 22, 2007

(87) PCT Pub. No.: WO2006/000546

PCT Pub. Date: Jan. 5, 2006

(65) Prior Publication Data

US 2008/0216555 A1    Sep. 11, 2008

(30) Foreign Application Priority Data

Jun. 28, 2004  (DE)  ........................ 10 2004 031 274

(51) Int. Cl.
*G01F 25/00*     (2006.01)
(52) U.S. Cl. ..................................................... 73/1.16
(58) Field of Classification Search .................. 73/1.16, 73/1.35, 1.82, 597, 861.27, 861.31, 861.18, 73/861.29
See application file for complete search history.

(56) References Cited

U.S. PATENT DOCUMENTS

| | | | | |
|---|---|---|---|---|
| 5,531,124 | A | 7/1996 | Kim et al. | 73/861.27 |
| 5,780,747 | A | 7/1998 | Soo | 73/861.29 |
| 5,856,622 | A | 1/1999 | Yamamoto et al. | 73/861.28 |
| 5,952,583 | A | 9/1999 | Chang | 73/861.18 |
| 2002/0053243 | A1* | 5/2002 | Su | 73/861.28 |
| 2006/0123922 | A1 | 6/2006 | Froehlich et al. | 73/861.29 |

FOREIGN PATENT DOCUMENTS

| | | |
|---|---|---|
| DE | 102 58 997 | 6/2004 |
| EP | 0 733 885 | 9/1996 |

* cited by examiner

*Primary Examiner*—Hezron Williams
*Assistant Examiner*—Tamiko D Bellamy
(74) *Attorney, Agent, or Firm*—Jordan and Hamburg LLP

(57) ABSTRACT

A position difference is created by mutual translation of sound transducers and the associated time difference is measured. Radiating surfaces of both sound transducers are arranged acoustically opposing one another in planes that are parallel to one another. The sound transducers are positioned at a mutual distance $x0+xd$, and sound transit time $t1$ between the sound transducers is measured, wherein position $x0$ is the distance for optimum acoustic coupling of the two sound transducers and xd is the deviation from this position that is designated as the deviation. The sound transducers are repositioned at another mutual distance $x0+xd+\Delta x$, and the sound transit time $t2$ between the sound transducers is measured. An acoustic calibration factor Ka is calculated from the distance difference $\Delta x$ and the time difference $\Delta t = t2 - t1$ using the formula $Ka = \Delta x / \Delta t$.

16 Claims, 4 Drawing Sheets

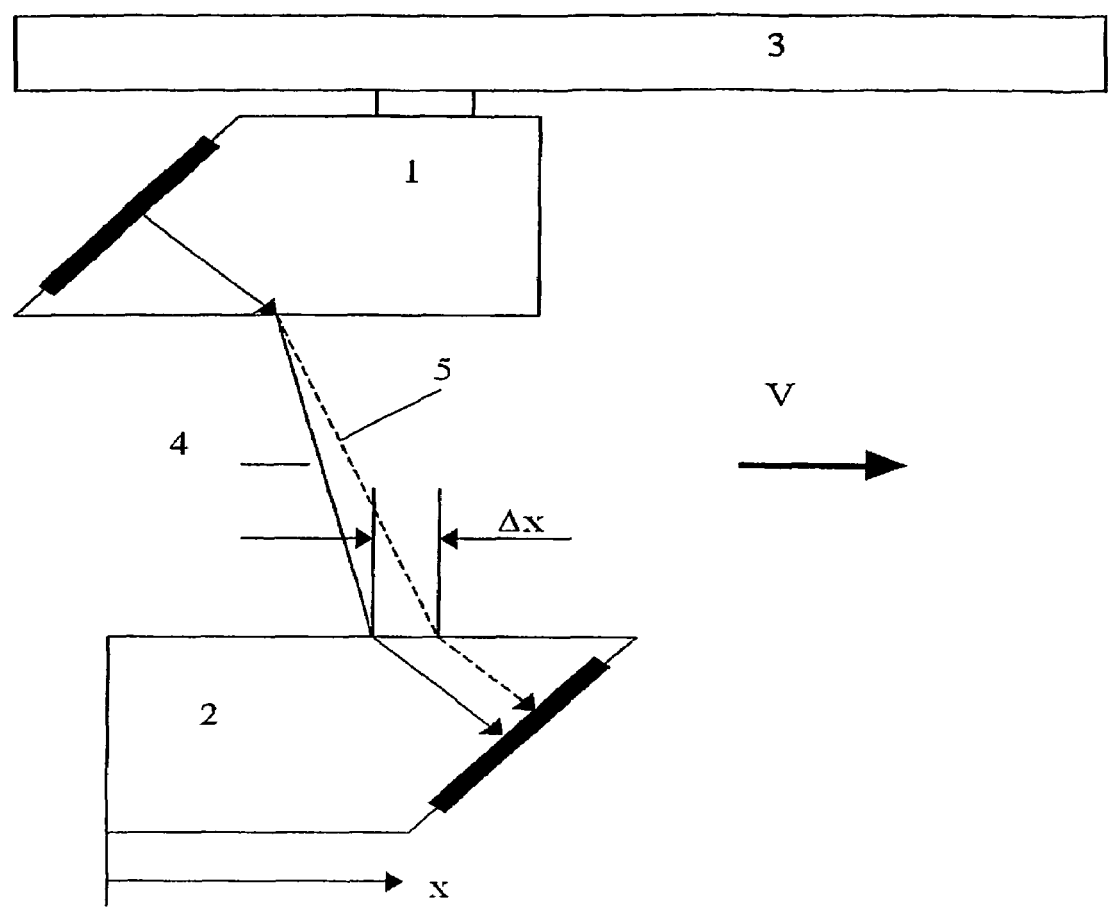
[Fig. 001]

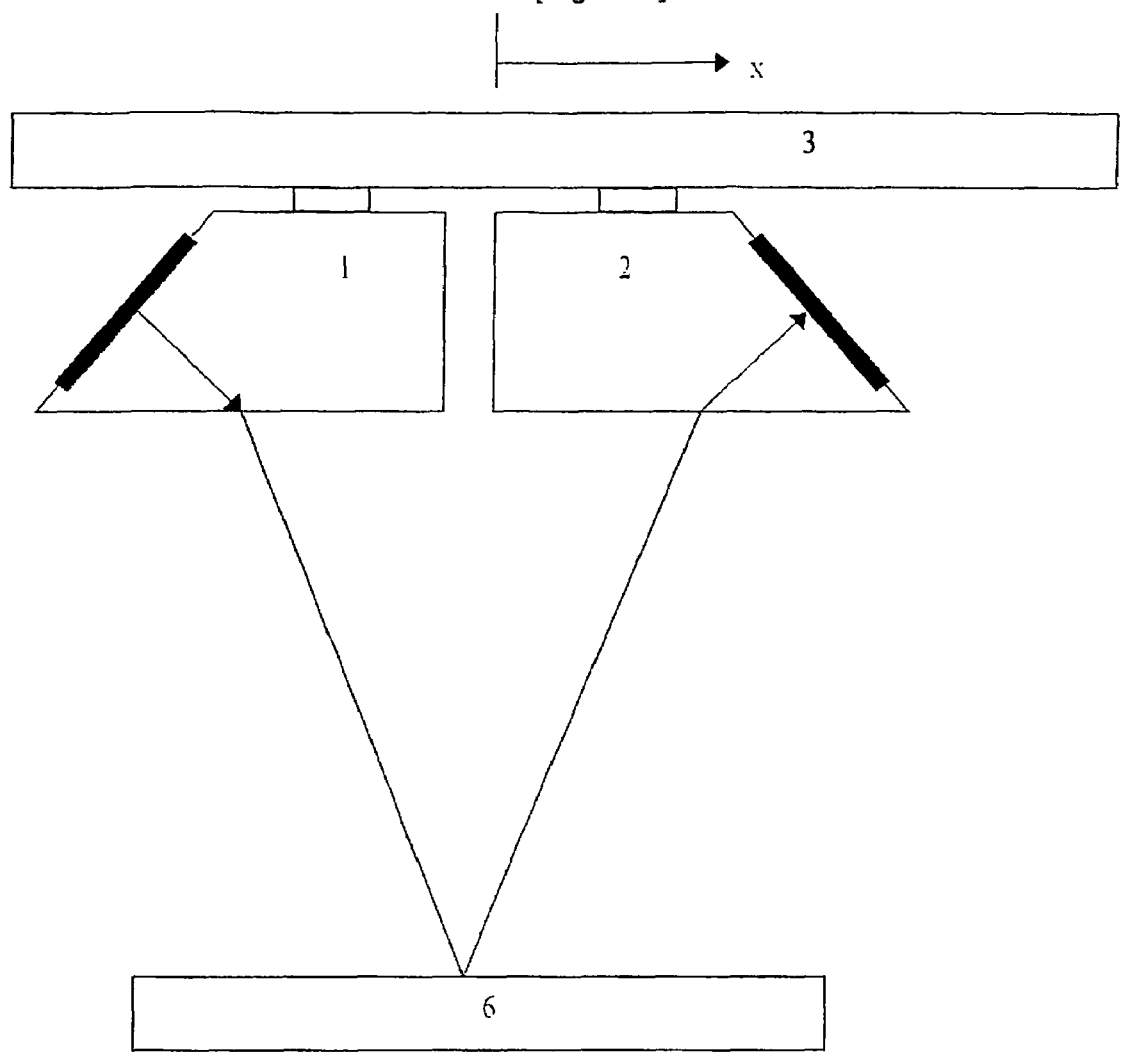
[Fig. 002]

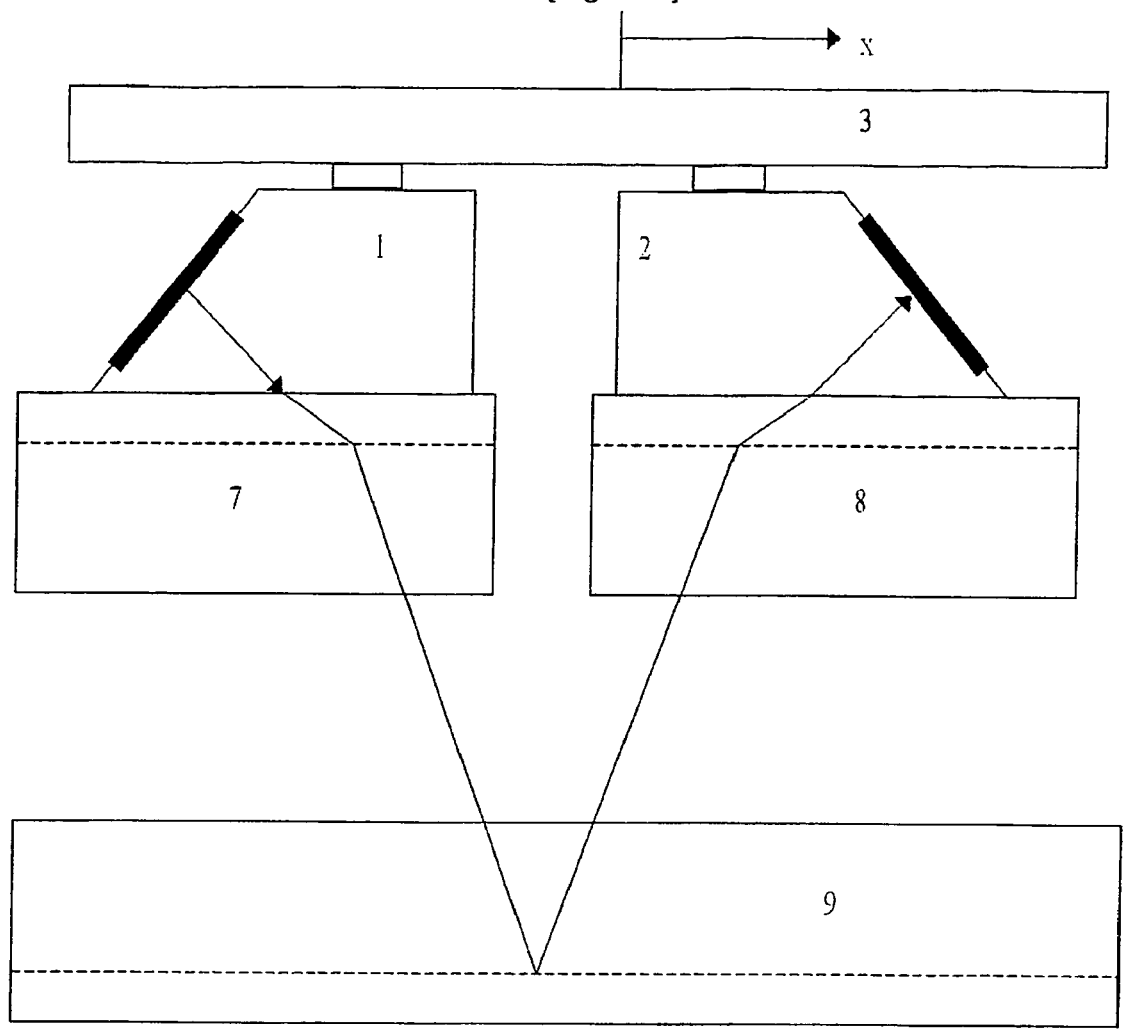

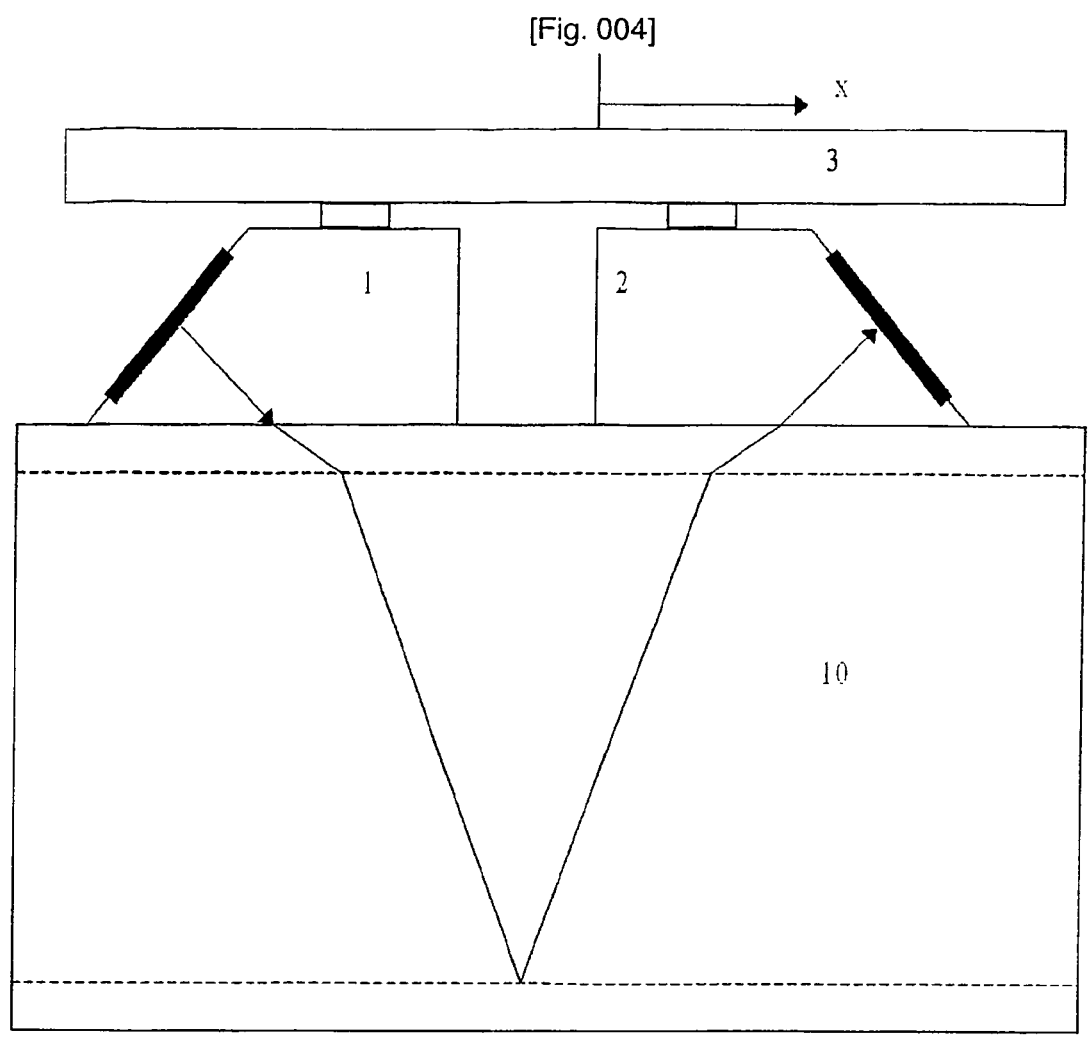
[Fig. 004]

METHOD FOR CALIBRATING ULTRASOUND CLAMP-ON FLOWMETERS

BACKGROUND OF THE INVENTION

The invention relates to a method for calibrating ultrasound clamp-on flowmeters using the transit time method.

Clamp-on flow-meters are widely used in many industrial fields. One of their essential advantages is that the flow measurement occurs in a contactless manner. With clamp-on flowmeter devices using the transit time difference method, the difference between two sound signals traveling with or against the direction of flow is measured, and the volume flow is calculated from this difference. The transit time difference is a function of the mean flow velocity Vl on the sound path, the sound angle of incidence in the fluid, and the sound transit time tfl. The relationship is described by the following formula:

$$Vl = Ka^* (\Delta t/2tfl) \qquad \text{Eq. (1)}$$

Ka is the acoustic calibration factor, which determines the angle of incidence in the fluid:

$$Ka = c\alpha/\sin(\alpha) \qquad \text{Eq. (2)}$$

The angle of incidence in the fluid is expressed here using the law of refraction with angle of incidence and sound velocity in the forward portion of the sound transducer. In order to calculate the volume flow, the flow mechanics calibration factor KF must also be known. This calibration factor KF represents the ratio of the mean surface of the flow velocity to the mean flow velocity on the sound path:

$$KF = VA/Vl \qquad \text{Eq. (3)}$$

Then, the volume flow Q with the cross-sectional area A of the pipe results in $$Q = KF^* A^* Ka^* (\Delta t/2tfl) \qquad \text{Eq. (4)}$$

The calculation of the acoustic calibration factor as the ratio of sound velocity and angle of incidence in the forward portion presupposes certain ideal assumptions. First, the sound transducers must be positioned optimally, that is, acoustically opposite one another. In practice there are always deviations from the optimum position. Moreover, the sound velocity in the forward portion of the sound transducer is a function of temperature. If the temperature of the measured object deviates significantly from the ambient temperature, the temperature in the sound transducer is also a function of location. Then the acoustic calibration factor can only be calculated numerically provided that the temperature distribution in the forward portion is known.

Also not taken into account by Ka are any effects of the pipe wall on the angle of incidence in the fluid.

Calibration is possible in cases in which the aforesaid deviations of the acoustic calibration factor become relevant and cannot be compensated by computation. Calibration is generally undertaken on a flow calibration stand. It is assumed that all of the variables contained in Eq. (4), i.e., volume flow Q, flow mechanics calibration factor KF, inner cross-sectional area of the pipe, and the transit time and transit time difference are known. The acoustic calibration factor can be calculated by reworking Eq. (4) to:

$$Ka = Q/A^* KF^* (\Delta t/2tfl)) \qquad \text{Eq. (5)}$$

However, calibration stands are only available for a small number of the measurement conditions that occur in practice. Preparing a reference volume flow for wide nominal widths or high temperatures is very complex.

SUMMARY OF THE INVENTION

The underlying object of the invention is to create a method for calibrating the acoustic calibration factor Ka of clamp-on flowmeters that works a reference volume flow being provided and that makes it possible to measure the volume flow.

In accordance with the invention, this object is attained using a method for calibrating ultrasound clamp-on flowmeters, in accordance with which a position difference is created by mutual translation of the sound transducers and by measuring the associated transit time difference. The radiating surfaces of both sound transducers are arranged acoustically opposing one another in planes that are parallel to one another.

In addition, according to the method disclosed herein:

a) the sound transducers are positioned at a mutual distance x0+xd and measurement of the sound transit time t1 between the sound transducers occurs in this position, x0 being the distance for optimum acoustic coupling of the two sound transducers and xd being the deviation from this position that is designated as the deviation;

b) the sound transducers are positioned at a mutual distance x0+xd+$\Delta$x and measurement of the sound transit time t2 between the sound transducers occurs in this position; and, c) the acoustic calibration factor Ka is calculated from the distance difference $\Delta$x and the time difference $\Delta t = t2 - t1$ using the formula $Ka = \Delta x/\Delta t$.

This method is performed for a sufficient number N of deviations xd in the receiving area xd1 through xd2 of the sound transducers for recording a measurement series of the acoustic calibration factor Ka(xd), which series is a function of the deviation.

In one embodiment the sound travel occurs between the sound transducers via one or a plurality of reflectors arranged in planes that are parallel to the sound transducers.

Another embodiment provides the sound energy via pipe segments, whereby it is possible to embody the pipe segments as reflectors.

The sound transducers can also be attached in the usual clamp-on arrangement, but displaceable in the direction of the pipe axis.

The inventive method is used for an ultrasound clamp-on flowmeter in order to improve measurement accuracy.

In the ultrasound clamp-on flowmeter, the volume flow is calculated with an acoustic calibration factor Ka(xd) that is a function of the deviation xd determined in one of the preceding embodiments.

The method can be implemented in an ultrasound clamp-on flowmeter.

At least one of the two sound transducers is equipped with an apparatus for varying the position and self-calibration can be performed insofar as the acoustic calibration factor Ka is determined according to the preceding embodiments.

The self-calibration of the flowmeter can take place during running operations.

The advantage of the method and the ultrasound clamp-on flowmeter is that the flowmeter can be calibrated without a reference volume flow. The flow does not have to be turned off during self-calibration in running operations.

Exemplary embodiments of the invention are described in greater detail using the drawings in the following.

BRIEF DESCRIPTION OF THE DRAWINGS

FIG. 1 depicts a directly opposing sound transducer arrangement, the position of sound transducer 1 in the x-direction being determined by the linear positioning unit 3;

FIG. 2 depicts a sound transducer arrangement with reflector 6, the position of the sound transducer in the x-direction being determined by the linear positioning unit 3;

FIG. 3 depicts a sound transducer arrangement with pipe segments, the position of the sound transducer in the x-direction being determined by the linear positioning unit 3; and FIG. 4 depicts a sound transducer arrangement on a pipe, the position of the sound transducer in the x-direction being determined by the linear positioning unit 3.

DETAILED DESCRIPTION OF THE INVENTION

The arrangement in FIG. 1 comprises two sound transducers 1 and 2, which are arranged acoustically opposite one another. This means that their radiating surfaces are parallel to one another and the distance between the sound transducers is selected such that the sound beam of the one sound transducer strikes the other sound transducer. This optimum distance should be called x0. As depicted in the drawings, the sound transducer 2 is arranged at the location x=0. Then the sensor distance is the position of the sound transducer 2. A fluid, e.g. water, is located between the sound transducers. The entire arrangement is immersed in a container so that the fluid fills at least the space between the radiating surfaces. The sound transducer 1 is held by the linear positioning unit 3 so that the position of the sound transducer in the x-direction, and thus the sensor distance, can be determined using the linear positioning unit.

The idea is to generate the measurement effect that a flowing fluid produces, in a resting fluid, using a movement of the sound transducer. Normally when calculating the measurement effect of the ultrasound flowmeter using the transit time difference method of models it is assumed that the flow velocity overlays the sound velocity vectorially and thus there is an associated change in the transit time. However, it is also possible to proceed from the local offset of the sound impulse that it experiences when traveling the path between the sound transducers and that occurs when the sound impulse travels with the flowing medium. FIG. 1 depicts the course 4 of the sound path with resting fluid and the course 5 when the fluid flows with flow velocity V. The local offset Dxv caused by the flow results from the flow velocity V1 and the transit time tfl as $$\Delta xv = V1 * tfl \qquad \text{Eq. (6)}$$

Reworking this equation using V1 and adding it to Eq. (1) obtains:

$$Ka = 2\Delta xv / \Delta t \qquad \text{Eq. (7)}$$

Twice the local offset over the time difference thus results in the acoustic calibration factor.

Turning now to a resting fluid, we measure the sound transit times t1 and t2 for the two positions x and x+Δx of the sound transducer 1. Using the position difference Δx and the difference in transit times Δt=t2−t1 it is also possible to calculate the acoustic calibration factor in accordance with Eq. 7:

$$Ka = 2\Delta x / \Delta t \qquad \text{Eq. (8)}$$

Thus the acoustic calibration factor can be determined without using a reference volume flow. Instead a position difference between the sound transducers is realized and the associated transit time difference is measured. For the measurement of the transit time difference, the clamp-on flowmeter itself can be used. In this manner not only the sensors, but also the entire measurement transducer, is calibrated.

The sound transmission is possible not only at the optimal distance x0 of the sound transducers, but also in a certain area x1 to x2 around this position. As already mentioned in the foregoing, the acoustic calibration factor then deviates from the value calculated in accordance with Eq. (2). The deviation xd identifies the difference of the sound transducer distance x from the optimum distance x0:

$$xd = x - x0 \qquad \text{Eq. (9)}$$

Since such deviations cannot be avoided in practice, it makes sense to measure the acoustic calibration factor Ka for a number of sound transducer distances within the receiving area using the described method. This series of measurements can then be used in the flowmeter in the form of a deviation-dependent acoustic calibration factor Ka(xd). Thus, instead of Eq. (4), the following formula is used:

$$Q = KF * A * Ka(xd) * (\Delta t / 2tfl) \qquad \text{Eq. (10)}$$

A sound transducer arrangement with reflector 6 is depicted in FIG. 2. The advantage of this arrangement is that both sound transducers can be arranged outside the fluid. Only the radiating surfaces and the reflector must be in the fluid.

The arrangement in accordance with FIG. 3 makes it possible to detect the effects of the pipe wall. For this, the sound transducers 1 and 2 are coupled to pipe segments 7 and 8 and the sound is reflected on an opposing pipe segment 9. In this manner there are nearly the same conditions present acoustically as during the actual measurement on a pipe. The use of pipe segments instead of a pipe, however, makes it possible to securely couple the sound transducers to the pipe segments and to displace them together with the pipe segments for measuring the acoustic calibration factor. When using a complete pipe 10, the sound transducer must be displaced relative to the pipe 10. This makes it difficult to keep the coupling constant. However, this is necessary if a specific measurement site is to be calibrated locally. In this case the measurement object is thus not imitated but rather is itself part of the calibration. FIG. 4 depicts such an embodiment of the invention. The sensors are clamped to the pipe 10 in the usual measurement arrangement. At least one of the two sound transducers is connected to a linear positioning unit. This embodiment of the invention furthermore makes it possible to self-calibrate the flowmeter in running operations. For this, the measurement process is interrupted at regular intervals and the transit time difference Δt is measured for the position difference Δx, and from this the acoustic calibration factor is determined in accordance with the invention. If this takes place only at a single sensor position, a complete linear positioning unit is not required, but rather only an apparatus that makes it possible to precisely adjust two sensor intervals. Such an apparatus can be integrated into the usual apparatus for attaching the sensor to the pipe.

The invention claimed is:

1. A method for calibrating ultrasound clamp-on flowmeters, comprising:
    arranging radiating surfaces of two sound transducers acoustically opposing one another in planes that are mutually parallel;
    positioning said sound transducers at a mutual distance x0+xd in a first position, x0 being the distance for optimum acoustic coupling of said two sound transducers and xd being the deviation from this position that is designated as the deviation;

measuring a sound transit time t1 between said sound transducers in said first position;

repositioning said sound transducers at an other mutual distance x0+xd+Δx in a second position;

measuring an other sound transit time t2 between said sound transducers in said second position; and calculating an acoustic calibration factor Ka from the distance difference Δx and the time difference Δt=t2−t1 using the formula Ka=Δx/Δt.

2. A method according to claim 1, further comprising performing said repositioning for a sufficient number N of deviations xd in a receiving area xd1 through xd2 of said sound transducers for recording a measurement series of the acoustic calibration factor Ka(xd), said series being a function of the deviation.

3. A method according to claim 1, wherein the sound travel occurs between said sound transducers via at least one reflector arranged in at least one plane parallel to the sound transducers.

4. A method according to claim 2, wherein the sound travel occurs between said sound transducers via at least one reflector arranged in at least one plane parallel to the sound transducers.

5. A method according to claim 1, wherein the sound transmission occurs via pipe segments.

6. A method according to claim 5, wherein the pipe segments opposing said sound transducers are embodied as reflectors.

7. A method according to claim 3, wherein the sound transmission occurs via pipe segments.

8. A method according to claim 7, wherein the pipe segments opposing said sound transducers are embodied as reflectors.

9. A method according to claim 1, wherein said sound transducers are attached on a pipe in a manner such that at least one of said two sound transducers is displaceable in a direction of the pipe axis.

10. A method according to claim 2, wherein said sound transducers are attached on a pipe in a manner such that at least one of said two sound transducers is displaceable in a direction of the pipe axis.

11. A method for volume flow measurement using the transit time difference method with clamp-on sound transducers, wherein an acoustic calibration factor measured using the method of claim 1 is employed for the volume flow calculation.

12. A method for volume flow measurement using the transit time difference method with clamp-on sound transducers, wherein an acoustic calibration factor measured using the method of claim 2 is employed for the volume flow calculation.

13. A method according to claim 11, wherein:
at least one of said two sound transducers is equipped with an apparatus for varying the position; and
self-calibration is performed by determination of the acoustic calibration factor Ka according to claim 10.

14. A method according to claim 12, wherein:
at least one of said two sound transducers is equipped with an apparatus for varying the position; and
self-calibration is performed by determination of the acoustic calibration factor Ka according to claim 2.

15. A method according to claim 13, wherein said self-calibration of said flowmeters during running operations.

16. A method according to claim 14, wherein said self-calibration of said flowmeters during running operations.

* * * * *